United States Patent [19]
Roerdink et al.

[11] Patent Number: 4,849,498
[45] Date of Patent: Jul. 18, 1989

[54] 4.6/4.I COPOLYAMIDE AND A PROCESS FOR THE PREPARATION THEREOF

[75] Inventors: Eize Roerdink, Beek; Jean M. M. Warnier, Stein, both of Netherlands

[73] Assignee: Stamicarbon B.V., AC Geleen, Netherlands

[21] Appl. No.: 111,064

[22] Filed: Oct. 22, 1987

[30] Foreign Application Priority Data

Oct. 30, 1986 [NL] Netherlands .......................... 8602729

[51] Int. Cl.$^4$ ............................................ C08G 69/26
[52] U.S. Cl. .................................... 528/339; 264/234; 264/345; 264/347; 528/347; 528/481; 528/503
[58] Field of Search ............... 528/339, 347, 481, 503; 264/234, 345, 347

[56] References Cited

U.S. PATENT DOCUMENTS 4,719,284  1/1988  Nielinger et al. ................... 528/339

*Primary Examiner*—Harold D. Anderson
*Attorney, Agent, or Firm*—Cushman, Darby & Cushman

[57] ABSTRACT

The invention relates to a copolyamide for application in films with improved barrier properties. The copolyamide containing tetramethyleneadipamide and tetramethylene-isophtalamide in a ratio between 9:1 and 1:9 and a relative viscosity of at least 2.0, and a process for the production of the copolyamide. Preferably the copolyamide contains a small amount of a compound that induces the formation of networks between the polyamide chains.

9 Claims, No Drawings

4.6/4.I COPOLYAMIDE AND A PROCESS FOR THE PREPARATION THEREOF

AIM OF THE INVENTION

A copolyamide which is suitable for application in films with improved barrier properties and a process for the preparation thereof.

STATE OF THE ART

Polyamides find many applications as films for wrapping food, for example. Nylon 4.6 is particularly suitable for specific applications requiring higher thermal stability. EP-A-158807 describes the preparation of films based on nylon 4.6.

However, nylon 4.6 presents a few disadvantages; on account of the high crystallization rate, it is very difficult to produce extremely thin, strong and clear films by means of biaxial stretching. In addition, the gas permeability which, in the case of nylon 4.6 in dry condition, is very low, appears to increase by almost a factor 10 in the case of the polyamide in moist condition.

The aim of the invention is therefore to modify the nylon 4.6 in such a manner that these disadvantages are met. More in particular, the aim of the invention is to find a copolymer of nylon 4.6 with improved processability and improved barrier properties in moist condition.

DESCRIPTION OF THE INVENTION

It has now been found that copolymers of nylon 4.6 and nylon 4.I, that is, copolymers based on tetramethylenediamine, adipic acid and isophthalic acid, have good processing properties and improved barrier properties for oxygen and carbon dioxide.

The copolyamide containing tetramethyleneadipamide units according to the invention is characterized in that it contains tetramethylene-isophthalamine units, the tetramethylene adipamide and tetramethylene-isophthalamide units being in a ratio between 9:1 and 1:9, and that the relative viscosity of the copolyamide, determined in a solution of 1 gram in 100 ml of 96 wt% sulphuric acid at 25° C., is at least 2.0.

At higher ratios than 9:1 the crystallinity and the crystallization rate decrease insufficiently, and at lower values than 1:9 then advantages presented by the higher thermal stability of nylon 4.6 are lost. The molecular weight of the copolyamide must be sufficiently high, for example corresponding to a relative viscosity of at least 2.0, determined in a solution of 1 gram of polyamide in 100 ml of 96 wt% sulphuric acid at 25° C., in order to be able to produce products with sufficient strength.

Preferably, the tetramethylene adipamide (4.6) and tetramethylene-isophthalamide (4.I) are in a ratio between 8:2 and 4:6, even more preferably between 7:3 and 5:5.

The copolymer composition is in principle not limited to 4.6 and 4.I units but may contain minor amounts, that is, less than 50%, preferably less than 20%, of other copolymer-forming monomers. These other copolymer-forming monomers may be, for example, amide-forming units, such as other diamines or dicarboxylic acids and lactams, imide-forming units or ester-forming units. The presence of these other copolymer-forming units is, however, preferably limited to at most 10–20% so that the barrier properties of the copolyamide are not affected too much. In addition, the copolyamide according to the invention may contain the usual additive such as lubricants, pigments, stabilizers, etc.

The molecular weight of the copolyamide may not be too low in view of the mechanical properties and must correspond to a relative viscosity of at least 2.0. Preferably the molecular weight corresponds to a relative viscosity of at least 2.3. A further advantage of a high molecular weight is the reduced gas permeability.

Such an increase in the relative viscosity and reduction of the gas permeability can also be obtained by incorporating a small amount of a compound (cross-linking agent) which induces the formation of networks between the polyamide chains, such as compounds which contain 2 or more epoxy groups per molecule, for example 1,6-hexanediol glycidyl ether, or diisocyanates, for example 1,6-hexanediisocyanate, if so desired with dilactam endgroups, dialkyl carbonates or diphenyl carbonate.

As little as possible of these compounds must be added, for example less than abt. 3 wt%, based on the total weight of the copolyamide composition. A minimum of about 0.05 wt% must be added to have a noticeable effect.

For the preparation of the copolyamides according to the invention the process known from the preparation of high-molecular weight nylon 4.6 may be used, in which process, in a first polycondensation step in the liquid phase, in an autoclave and at increased pressure, a low-molecular prepolymer is prepared from the nylon salts of 4.6 and 4.I, which prepolymer is subsequently further condensed in a second polymerization step in the solid phase to form a high-molecular product. Such a process is described in, for instance, EP-B-0038094. However, this process does not appear to be very practical for the preparation on a larger scale of the preferred copolyamides according to the invention, that is, those with a 4.6:4.I ratio of abt. 8:2 and less, because at these higher 4.I contents the prepolymer produced is a cheese-like mass that is difficult to handle. Moreover, the melting point of the copolyamides rich in 4.I is lowered to such an extent that the temperature for after-condensation in the solid phase must be so low to prevent melting, that extremely long after-condensation times are necessary to produce a high-molecular product.

However, the route known from the preparation of nylon 6.6, in which, at atmospheric or reduced pressure, using nylon salts or a mixture of the monomers, a high-molecular product is obtained in the melt, appears to result only in product with a relative viscosity of at most abt. 1.65 in the case of 4.6/4.I copolyamide. In addition, the polycondensation is adversely affected in practice, because the isophthalic acid, which, at the temperatures required for the polycondensation in the melt, is highliy volatile, evaporates and is deposited in the cooler parts of the process equipment, thus causing, for example, blocked pipes and preventing complete control of the composition of the copolyamide to be produced. An attempt was therefore made to find a process for the preparation of nylon 4.6/4.I which does not present these disadvantages, and which would provide a process for the preparation of the preferred nylon 4.6/4.I composition according to the invention that is suitable for practical application.

It has now been found that it is in fact possible to produce, in a process that can be applied in practice, high-molecular weight nylon 4.6/4.I with higher 4.I contents by successively causing the nylon salts of 4.6 and 4.I or, if so desired, the monomers of the copolyamide to react for a relatively short period of time, if desired at increased pressure, in the presence of water, to remove the water by distillation and then continue the polycondensation at atmospheric or reduced pressure in the melt to form a melt polymer from which threads can be drawn, which is finally further condensed in the solid phase.

The process for the preparation of copolyamides substantially consisting of tetramethylene-adipamide and tetramethylene-isophthalamide by using tetramethylenediamine, adipic acid and isophthalic acid and, if so desired, another monomer or the salts thereof according to the process of the invention is characterized in that, successively, (a) a mixture of tetramethylenediamine, adipic acid, isophthalic acid and, if so desired, another monomer or the salts thereof, if so desired in the presence of an excess of tetramethylelnediamine and in the presence of added water, is heated, if so desired at increased pressure, to a temperature between abt. 200 and abt. 280° C.;

(b) the pressure is reduced to a value between abt. 0.01 and 1 atmosphere and the polycondensation reaction is continued at a temperature between abt. 220° and abt. 280° C. until a prepolymer is formed which has such a high molecular weight that it can be moulded from the melt into the solid phase, and (c) the shaped articles formed from the melt of the prepolymer obtained in (b) are subjected to after-condensation at a temperature below the melting point of the polycondensate.

Since tetramethylenediamine is also volatilized in the distillation of water effected in (b) and in some cases also already in (a), allowance must be made for this in composing the monomer mixture in (a). The amount of tetramethylenediamine volatilized in this manner depends strongly on the reaction conditions such as temperature, the amount of water to be removed by distillation, etc. and must be determined for each separate case and may range from, for example, 0.5 to 30 mole%, based on the acid present.

However, it is preferable to use an amount of tetramethylene diamine exceeding the amount required to compensate for the distillation losses to such an extent that the sum of carboxyl and cyclic end groups (=c+p) in the polycondensate obtained in (b) differs only little from the number of amine endgroups (=a). For example abt. $-0.5$ a $< c+p-a <$ abt. 0.5 a, preferably abt. $-0.25$ a $< (c+p-a) <$ abt. 0.25 a.

Extra water is added to the monomer mixture or the nylon salts to promote a more homogeneous reaction. This amount of water may range, for example, from 0.1 to 200 wt%, based on the amount of monomer.

The temperature of the first polycondensation step (a) is chosen between abt. 200 and abt. 280° C. because the reaction rate is too low at temperatures below 200° C., whereas at temperatures above 280° C., a polycondensate is obtained that can only with difficulty be further condensed to form high-molecular weight product. Preferably, the temperaature is chosen between abt. 210° and 260° C.

Step (b) may be started after only a few minutes, depending on the temperature chosen for polycondensation step (a), for example 5 minutes in the case of the highest temperature, or after more than 1 hour in the case of the lowest temperature.

The pressure in process step (a) depends on, among other factors, the temperature chosen, the water content and the capacity of the reactor and is generally not higher than about 15 bar, and can, if so desired, be controlled by venting steam.

In some cases it is advantageous to precede process step (a) by the formation of the trimer of isophthalic acid with tetramethylenediamine units. The trimer is formed, for example, by causing stoichiometric amounts of methanol and isophthalic acid to react, if so desired in the presence of an excess of tetramethylenediamine. After removal by distillation of the methanol, the desired amounts of adipic acid and water are added to the trimer and any tetramethylenediamine present, and then the polycondensation step (a) is effected.

The polycondensation process can be accelerated by addition of an acid catalyst such as phosphorous acid.

The prepolymer from step (b) can be moulded from the melt, for example by causing the contents of the reactor in which the polycondensation has taken place to flow, in molten condition, into an icewater bath. The solid thus obtained can then be reduced to pellets of a defined size, for example by grinding or cutting, which pellets can be subjected to a solid phase after-condensation (c).

The contents are preferably caused to flow into the cold ice water bath in a controlled manner, for example at a constant rate through defined channels, so that the prepolymer is obtained as thick threads, which are subsequently chopped up to form granulate, which is subjected to the after-condensation.

To be suitable for handling in the solid phase, the prepolymer must have a sufficiently high molecular weight, which, depending on the isophthalic acid content of the copolyamide, may correspond to a relative viscosity between about 1.3 and about 1.6. For higher isophthalic acid contents a higher relative viscosity is required.

Other comonomers which may be used for the copolyamide compositions according to the invention may, if so desired, already be added in the first polycondensation step. Other additives such as colourants, pigments, stabilizers, fillers and reinforcements and other polymers are preferably added to the high-molecular weight material produced in step (c). However, in some cases it may be advantageous to add one or more of these substances before the after-condensation step (c). Such addition is preferably accomplished before polycondensation step (b) has ended.

The temperature of the after-condensation (c) must be as high as possible, that is, as little as possible below the melting point of the copolyamide. Depending on the composition of the copolyamide, this temperature is between about 200° and about 240° C.

EXAMPLES

The invention is further elucidated with the help of the following examples and comparative examples, to which it is, however, not limited.

The following methods are applied for the determination of the various characteristic quantities.

End group determination:

The amino endgroups are determined by means of potentiometric titration of a solution of the copolyamide in phenol with hydrochloric acid in a mixture of glycol and phenol at increased temperature. The carboxylic endgroups are determined in a similar manner by potentiometric titration of a copolyamide solution in a mixture of o-cresol and benzyl alcohol with tetrabutyl ammonium hydroxyde in a mixture of 2-propanol and methanol. The cyclic end group content, the pyrrolidine content, is determined by means of gas-liquid chromatography after complete hydrolysis with hydrochloric acid and extraction with chloroform.

Relative viscosity:
This is determined in a solution of 1 gram of polyamide in 100 ml of 96 wt% sulphuric acid at 25° C.

Gas permeation:
The oxygen and carbondioxide gaspermeability constants (PO2 and PCO2, respectively) are obtained from the amount of oxygen and carbondioxide transmitted, determined at 30° C. with a GPM-200-type gaspermeability tester of Lypsy Co. in Switzerland, using a mixture of $O_2$ and $CO_2$ in a volumetric proportion of $O_2:CO_2=80:20$.

EXAMPLE I 217 grams (1.306 moles) of isphthalic acid, 303 grams (3.443 moles) of tetramethylenediamine, (DAB), plus an excess of 59 grams of DAB (0.670 moles) are introduced into a 2.5 liter stainless steel reactor together with 312 grams (2.135 moles) of adipic acid and 829 grams of water.

The reactor is equipped with a stirrer, a condensor and a thermocouple holder.

The contents of the reactor are heated to 210°-215° C. in about 30 minutes, with simultaneous distillation of water at a pressure of 1 atm. The distillation is continued for 15 minutes under these conditions. The reactor contents are then heated to 242° C. in about 5 minutes, at 1 atm., which temperature is then maintained for 4 hours at a pressure of 10 m.bar. The melt is discharged into a container of icewater to produce threads with diameters of 1.5 mm. These are cut up to granulate with lengths of abt. 4 mm.

Analysis of the prepolymer thus obtained produced the following results: $\eta rel=1.46$; a=0.18 meq/g; c=0.11 meq/g and; p=0.10 meq/g.

The prepolymer granulate is subsequently after-condensed in a 10 liter rotating tumbling dryer for 50 hours at 210° C. by passing over a nitrogen/stream mixture consisting of 35 grams of $H_2O/h$ and 88N liters of $N_2/h$.

This causes the molar mass to increase as appears from the decrease of the end group concentration and the increase in $\eta_{rel}$: $\eta_{rel}=2.00$; a=0.042 meq/g; c=0.080 meq/g; p=0.05 meq/g.

The material is moulded to form an approx. 100μ thick film. This film is subsequently stretched biaxially (3×3) at approx. 90° C. A clear film is obtained.

The barrier properties of this film are:

|  | PO2 | PCO2 |
|---|---|---|
| 4.6/4.1 dry | 0.40 | 1.2 |
| 4.6/4.1 wet | 1 | 12 |
| PET | 4 | 20 |

(dimensions: 10-12 cc.cm/cm$^2$.sec.cmHg).

EXAMPLE II 199.9 grams (1.203 moles) of isophthalic acid, 322.7 grams (3.667 moles) of DAB and an excess of DAB amounting to 150 grams (1.70 moles), 359.3 grams (2.459 moles) of adipic acid and 882 grams of water are introduced into the reactor according to example I.

The reactor contents are heated for 1 hour to 250° C., with simultaneous distillation at 1 atm. of the water, and maintained at this temperature for abt. 2.5 hours.

Analysis of the prepolymer produced: $\eta_{rel}=1.48$; a=0.21 meq/g; c=0.13 meq/g; p=0.09 meq/g.

The prepolymer is subsequently after-condensed for 50 hours at 250° C.

Analysis: $\eta_{rel}=2.53$; a=0.029 meq/g; c=0.069 meq/g; p=0.04 meq/g.

The copolyamide can be stretched to form a film without any problems, the product obtained being clear.

The barrier properties of the product are:

|  | PO2 | PCO2 ($10^{-12}$ cc.cm/cm$^2$.sec.cmHg) |
|---|---|---|
| dry | 0.35 | 1.0 |
| wet | 0.8 | 8 |

EXAMPLE III 764 grams of 4.6 salt (3.265 moles), 129 grams of 4.I salt (0.508 moles) and an excess of 14 grams of DAB (0.159 moles) are introduced into the 2.5 liter reactor described in example I.

The mixture is heated to 210° C. at autogenous pressure and maintained at this temperature for 30 minutes. The product is subsequently discharged from the reactor, resulting in a fine white powder.

This powder is subjected to solid phase after-condensation as described in example I, but now for 24 hours at 240° C. The $\eta_{rel}$ of this product is 2.14. The barrier properties at PO$_2$=0.5 and PCO$_2$=1.6.

The film obtained is slightly opaque white.

EXAMPLE IV 217 grams of isopthalic acid (1.307 moles), 303 grams of DAB (3.443 moles) and an excess of DAB of 113 grams (1.28 moles), 312 grams of adipic acid (2.137 moles), 4 grams of phosphorous acid and 829 grams of water are introduced into the reactor according to example I.

The reactor contents are heated to 248° C. in 0.5 hour with simultaneous distillation at 1 atm and maintained at that temperature for 1 hour and 10 minutes.

The reactor contents are discharged into an ice water bath.

Analysis: $\eta_{rel}=1.56$; a=0.14 meq/g; c=0.81 meq/g; p=0.14 meq/g.

The prepolymer granulate is after-condensed in the solid phase for 50 hours at 210° C.

Result: $\eta_{rel}=2.03$; a=0.059 meq/g; c=0.11 meq/g; p=0.07 meq/g.

The barrier properties of this material are:

| PO2 | PCO2 |
|---|---|
| 0.4 | 1.2 |

COMPARATIVE EXAMPLE I

A prepolymer 4.6/4.1 with a molar ratio of 60-40 and a $\eta_{rel}$ of 1.65 could not be stretched.

COMPARATIVE EXAMPLE II

A 4.6/4.1 copolymer with a molar ratio 92/8 and a $\eta_{rel}$ of 2.33 could be stretched biaxially with great difficulty. However, the film was not clear.

EXAMPLE V 316.9 grams of adipic acid (2.479 moles), 274.4 grams of isophthalic acid (1.653 moles) and 363.6 grams of DAB (4.132 moles) and an excess of 100 grams of DAB, 1100 grams of water are introduced into the reactor according to example I and mixed. After mixing 0.15 wt.% relative to the total amount of monomers of Vernetzer D ®. (diphenylcarbonate) of Bruggeman Germany is added and the reactor heated to 240° C. in 0.5 hour with simultaneous destillation at atmospheric pressure and maintained at that temperature during 2.5 hours. The reactor contents are discharged into an icewater bath. The prepolymer granulate obtained is after-condensed in the solid phase for 46 hours at 225° C.

Result: $\eta_{rel}=2.58$.

|     | $PO_2$ | $PCO_2$ |
| --- | --- | --- |
| dry | 0.3 | 1.0 |
| wet | 0.8 | 5.0 |

EXAMPLE VI

Example V was repeated, however instead of Vernetzer B 0.10 wt.%. of Denacol Ex212 ®, 4.6 hexanedioldiglycidylether of Magax, Japan was added.

Prepolymerisation and aftercondensation were performed during 3.5 and 50 hours respectively.

Result: $\eta_{rel}=2.38$.

|     | $PO_2$ | $PCO_2$ |
| --- | --- | --- |
| dry | 0.4 | 1.2 |
| wet | 0.9 | 6 |

We claim:

1. Copolyamide containing tetramethylene adipamide units and tetramethylene-isophthalamide units, wherein said tetramethylene-adipamide and tetramethylene-isophthalamide units are present in a ratio between 7:3 and 5:5, and having a relative viscosity, determined in a solution of 1 gram in 100 ml of 96 wt% sulphuric acid at 25° C., of at least 2.0.

2. Copolyamide according to claim 1, wherein the relative viscosity is at least 2.3.

3. Process for the preparation of a copolyamide containing tetramethylene adipamide units and tetramethylene-isophthalamide units, wherein said tetramethylene adipamide units and tetramethylene-isophthalamide units are in a ratio between 7:3 and 5:5, having a relative viscosity, determined in a solution of 1 gram in 100 ml of 96 wt% sulphuric acid at 25° C. of at least 2.0, said process comprising the steps of successively:

(a) heating a mixture of tetramethylenediamine, adipic acid, and isophthalic acid, or the salts thereof, to a temperature between about 200° and about 280° C.;

(b) reducing the pressure to a value between about 0.01 and 1 atmosphere and continuing the polycondensation reaction at a temperature between about 220° and about 280° until a prepolymer is formed which has a sufficiently high molecular weight so that it can be molded from the melt into the solid phase, and such that the sum of the number of carboxyl and cyclic endgroups, c+p respectively, in the prepolymer obtained in step (b) differs from the number of amine groups, a, according to the relationship $-0.5\ a < c + p - a < +0.5\ a$; and (c) thereafter subjecting a shaped article formed from the melt of the prepolymer obtained in step (b) to an after-condensation at a temperature below the melting point of the polycondensate.

4. Process according to claim 3, wherein the isophthalic acid in process step (a) is in the form of the trimer of isophthalic acid with 2 tetramethylenediamine units.

5. Process according to claim 3, characterized in that the prepolymer obtained in process step (b) has a relative viscosity of between at least 1.3 and 1.6.

6. Process according to claim 3, additionally comprising an acid catalyst.

7. Process according to claim 3, wherein the mixture in step (a) further comprises another copolyamide-forming monomer selected from the group consisting of diamines, dicarboxylic acids, lactams, imide-forming units and ester-forming units.

8. Process according to claim 3, wherein the mixture in step (a) contains the tetramethylenediamine in molar excess relative to the amount of adipic acid and isophthalic acid.

9. Process according to claim 3, wherein the mixture in step (a) further comprises added water.

* * * * *